(12) United States Patent
Strashny

(10) Patent No.: US 10,711,874 B2
(45) Date of Patent: Jul. 14, 2020

(54) TRANSMISSION SYSTEM FOR A PROPULSION SYSTEM

(71) Applicant: Perkins Engines Company Limited, Peterborough (GB)

(72) Inventor: Igor Strashny, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/300,700

(22) PCT Filed: Apr. 5, 2017

(86) PCT No.: PCT/GB2017/050949
§ 371 (c)(1),
(2) Date: Nov. 12, 2018

(87) PCT Pub. No.: WO2017/203198
PCT Pub. Date: Nov. 30, 2017

(65) Prior Publication Data
US 2019/0170232 A1  Jun. 6, 2019

(30) Foreign Application Priority Data

May 27, 2016 (GB) .................................. 1609432.8

(51) Int. Cl.
*B63H 21/20* (2006.01)
*F16H 47/04* (2006.01)
(Continued)

(52) U.S. Cl.
CPC .............. *F16H 47/04* (2013.01); *B60K 6/42* (2013.01); *B63H 21/20* (2013.01); *F16H 3/72* (2013.01);
(Continued)

(58) Field of Classification Search
CPC .. F16H 47/04; F16H 3/72; B60K 6/42; B63H 21/20
See application file for complete search history.

(56) References Cited

U.S. PATENT DOCUMENTS 3,803,843 A * 4/1974 Nyman ................. B60W 10/06
60/445
8,758,181 B2 * 6/2014 Calvert ................... F16H 47/04
475/73
(Continued)

FOREIGN PATENT DOCUMENTS

GB        2514183 A       11/2014
WO    WO 2014/184517 A1  11/2014

OTHER PUBLICATIONS

International Search Report for related International Application No. PCT/GB2017/050949; dated Sep. 20, 2017.
(Continued)

*Primary Examiner* — Stephen P Avila

(57) ABSTRACT

A transmission for a propulsion system. The propulsion system includes a power unit, a power transfer system, and a propulsion element. The transmission incorporates a summation, a propulsion output, and a power transfer transmission system, which receives power from the power unit and/or the power transfer system of the propulsion system. The power transfer transmission system includes a propulsion output transmission and a summation transmission, where the propulsion output transmission receives power from the summation transmission and directs the power to the propulsion element. The power transfer transmission system provides for transfer of power between the power transfer system and the summation transmission. The power transfer transmission system includes a power transfer shaft and a power transfer coupler and selectively connects the power transfer shaft to a propulsion outlet shaft, such that
(Continued)

power is transferred directly from the power transfer system to the propulsion output transmission.

24 Claims, 9 Drawing Sheets

(51) Int. Cl.
    *B60K 6/42*         (2007.10)
    *F16H 3/72*         (2006.01)
    *F16H 37/08*       (2006.01)

(52) U.S. Cl.
    CPC .. *B63H 2021/202* (2013.01); *F16H 2037/088* (2013.01); *F16H 2047/045* (2013.01)

(56) References Cited

U.S. PATENT DOCUMENTS

2008/0085801 A1*   4/2008   Sedoni ................... B60K 17/28
                                                                           475/72
2010/0204000 A1     8/2010   Bailly et al.

OTHER PUBLICATIONS

United Kingdom Search Report for related GB Application No. 1609432.8 dated Nov. 22, 2016.

\* cited by examiner

TRANSMISSION SYSTEM FOR A PROPULSION SYSTEM

CROSS-REFERENCE TO RELATED APPLICATION

This Application is a 35 USC § 371 US National Stage filing of International Application No. PCT/GB2017/050949 filed on Apr. 5, 2017 which claims priority under the Paris Convention to United Kingdom Patent Application No. 1609432.8 filed on May 27, 2016.

TECHNICAL FIELD

This disclosure is directed towards a transmission system for a propulsion system. The propulsion system may be for a marine vessel. This disclosure is further directed towards a propulsion apparatus and methods of operating the propulsion system and propulsion apparatus.

BACKGROUND

Propulsion systems for machines typically comprise one or more power units, such as gas turbines and/or reciprocating engines. Such machines include vehicles, such as marine vessels, aircraft or land vehicles. The power output from the power units may, for example, provide the required loads to house loads, operator quarters or work tools and, if work machine is a vehicle, provide a thrust for enabling the machine to move. The range of potential power output from the power unit may be selected in order to meet the expected loads required in the operating profiles of the work machine. There are also environmental and cost reduction benefits in operating such power units efficiently. In particular, the power unit may be selected to operate at maximum efficiency at the vehicle cruising speed, which is the speed at which the vehicle moves for the majority of the time it is operational. Marine vessels typically comprise either a mechanical or an electrical propulsion system. In a mechanical propulsion system power may be transferred between a power unit and a propeller via a mechanical transmission. An electrical propulsion system may comprise a one or more power unit(s) driving an electric generator, which feeds power to at least one electric motor to drive one or more propeller(s).

A hybrid propulsion system may be utilised to improve flexibility, redundancy and efficiency. WO-A-2014/184517 discloses a hybrid propulsion system in which at least one power unit is operably connected to a transmission via a mechanical arrangement and/or via an alternate power transfer arrangement, such as a hydraulic or electric arrangement.

The transmission may be a planetary gearbox, which may enable the transmission to combine power from the mechanical and alternate power transfer arrangements or to receive power from the mechanical arrangement and supply power to the alternate power transfer arrangement. The transmission may provide a power output for propelling a vehicle.

SUMMARY

The present disclosure provides a transmission system for a propulsion system, the propulsion system comprising at least one power unit, a power transfer system and at least one propulsion element, the transmission system comprising: a summation transmission configured to receive power from the at least one power unit and/or power transfer system; a propulsion output transmission comprising a first propulsion output shaft and configured to receive power from the summation transmission and direct the power to the at least one propulsion element; and a power transfer transmission operably connected to the summation transmission and configured to transfer power between the summation transmission and the power transfer system; wherein the power transfer transmission comprises a first power transfer shaft and a power transfer coupler configured to selectively operably connect the first power transfer shaft to the first propulsion output shaft such that power is transferred directly from the power transfer system to the propulsion output transmission.

The present disclosure further provides a method of operating a transmission system for a propulsion system, the propulsion system comprising at least one power unit, a power transfer system and at least one propulsion element, the transmission system comprising: a summation transmission configured to receive power from the at least one power unit and/or power transfer system; a propulsion output transmission comprising a first propulsion output shaft and configured to receive power from the summation transmission and direct the power to the at least one propulsion element; and a power transfer transmission operably connected to the summation transmission and configured to transfer power between the summation transmission and the power transfer system, the power transfer transmission comprising a first power transfer shaft and a power transfer coupler, wherein the method comprises: receiving power at the power transfer transmission from the power transfer system; determining whether to engage the power transfer coupler; and engaging the power transfer coupler such that the first power transfer shaft is operably connected to the first propulsion output shaft such that power is transferred directly from the power transfer system to the propulsion output transmission.

The present disclosure further provides a transmission system for a propulsion system for a marine vessel, the propulsion system comprising at least one power unit having a power unit output shaft, a power transfer system and at least one propulsion element, the transmission system comprising: a summation transmission configured to receive power from the at least one power unit and/or power transfer system and provide a power output to the at least one propulsion element; a power unit transmission for mounting to the at least one power unit output shaft to receive a rotational input therefrom, the power unit transmission being configured to selectively direct power from the rotational input to the summation transmission and/or power transfer system and comprising at least one coupler for selectively directing the rotational input to the summation transmission in a first rotational direction or a second rotational direction.

The present disclosure further provides a method of operating a transmission system for a propulsion system for a marine vessel, the propulsion system comprising at least one power unit having a power unit output shaft, a power transfer system and at least one propulsion element, the transmission system comprising: a summation transmission configured to receive power from the at least one power unit and/or power transfer system and provide a power output to the at least one propulsion element; a power unit transmission mounted to the at least one power unit output shaft to receive a rotational input therefrom and comprising at least one coupler configured to selectively direct power from the rotational input to the summation transmission and/or power transfer system, the method comprising: receiving the rotational input at the power unit transmission from the at least one power unit output shaft; operating the at least one coupler to direct the rotational input to the summation transmission in a first rotational direction or a second rotational direction.

The present disclosure further provides a method of operating a propulsion apparatus, the propulsion apparatus comprising: at least two propulsion systems, each comprising: a transmission system configured to provide a power output to at least one propulsion element; at least one first energy conversion machine; at least one primary power unit operable to selectively drive the transmission system and/or the at least one first energy conversion machine; and at least one second energy conversion machine operable to selectively drive or be driven by the transmission system, at least one secondary power unit configured to selectively provide power to at least one power generator; and a power transfer system for transferring power between the first and second energy conversion machines and at least one power generator; wherein the method comprises: receiving a demand to drive the at least one propulsion element at a system output speed; operating at least one primary and/or secondary power unit to provide power to the at least one propulsion element via the power transfer system and/or transmission system.

By way of example only, embodiments of a transmission system, propulsion system and propulsion apparatus are now described with reference to, and as shown in, the accompanying drawings.

DETAILED DESCRIPTION

The present disclosure is generally directed towards providing further improvements to the flexibility, redundancy and efficiency of the hybrid propulsion system of WO-A-2014/184517. The present disclosure is generally directed towards a propulsion system comprising at least one power unit operably connected to a transmission system via a mechanical arrangement and/or via an alternate arrangement, such as a hydraulic or electrical route.

In the description below, the term "operably connected" means that one component drives another component, for example by using coupling means. The coupling means may comprise engaged gears, connected shafts, torque converters, clutches, transmissions and any other suitable means for transferring power.

The propulsion systems are particularly applicable to marine vessels and the following exemplary embodiments specifically refer to the use of the propulsion system in marine vessels, such as ships. However, the propulsion system may be used in any other form of work machine, such as land vehicles.

Figure 1:
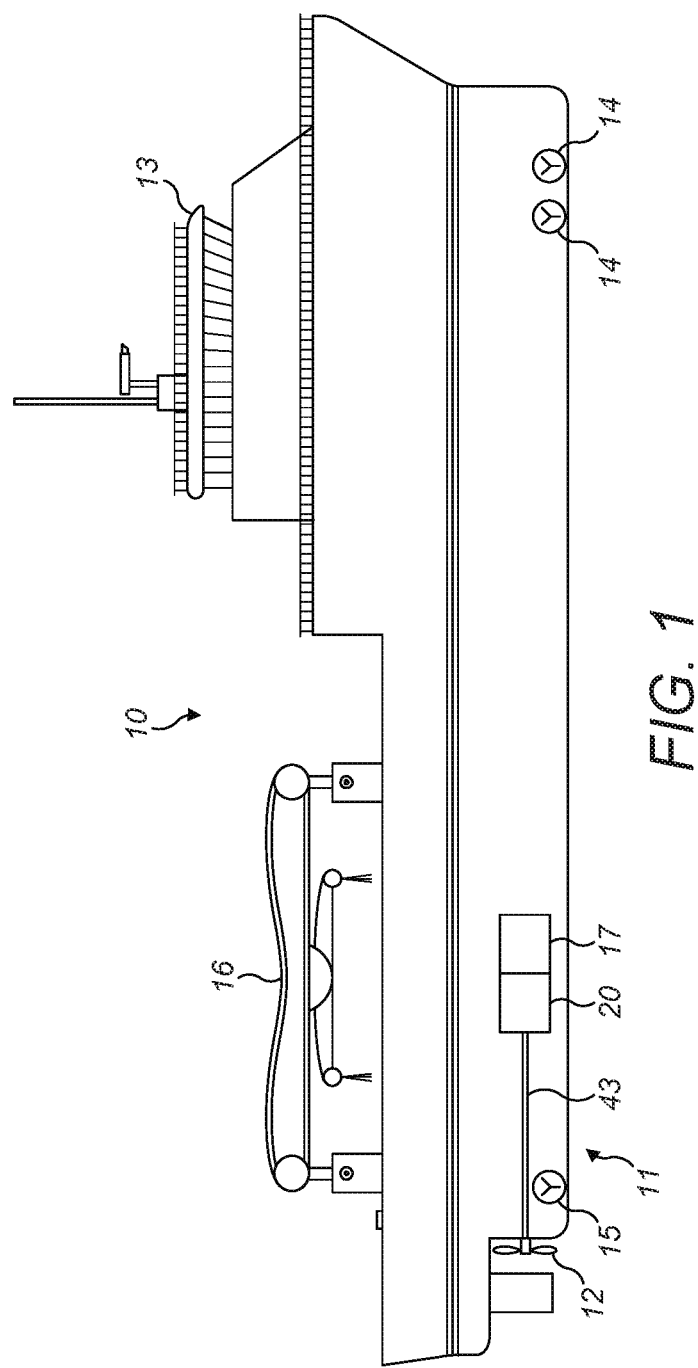
FIG. 1 is a side elevation of a marine vessel comprising the transmission system and propulsion system of the present disclosure.

FIG. 1 illustrates an exemplary marine vessel 10, in this case an anchor handling tug supply vessel, comprising the propulsion system 11 of the present disclosure. The propulsion system 11 may be configured to provide thrust via a propulsion element 12, such as a propeller, to move the marine vessel 10. The propulsion system 11 may also provide a power supply to operator quarters 13, bow thrusters 14, stern thrusters 15, crane 16 and the like. As discussed below, the marine vessel 10 may comprise a plurality of propulsion systems 11 which may be connected such that power can be transferred between them.

Figure 2:
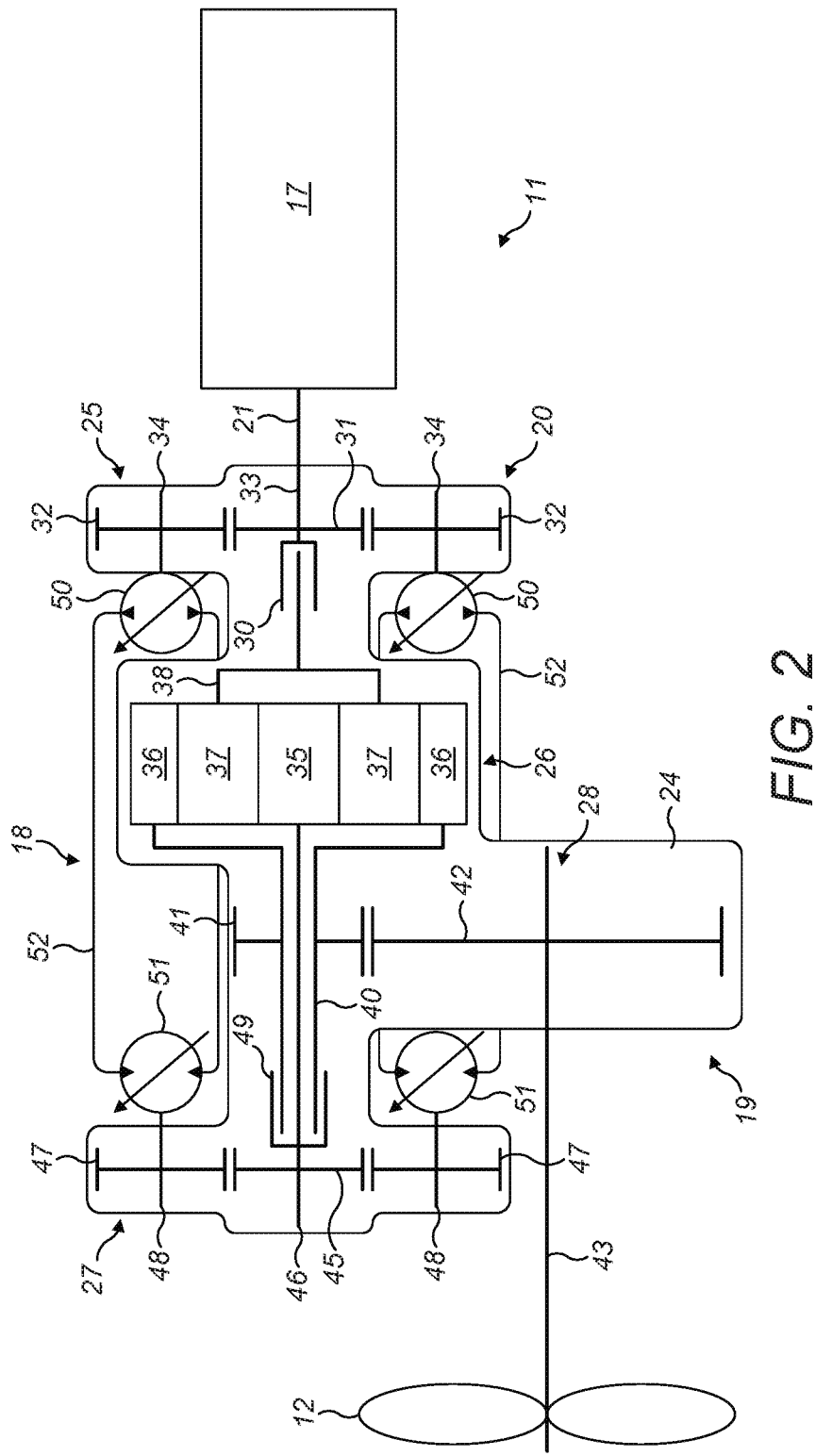
FIG. 2 is a schematic of a propulsion system of the present disclosure.
Figure 3:
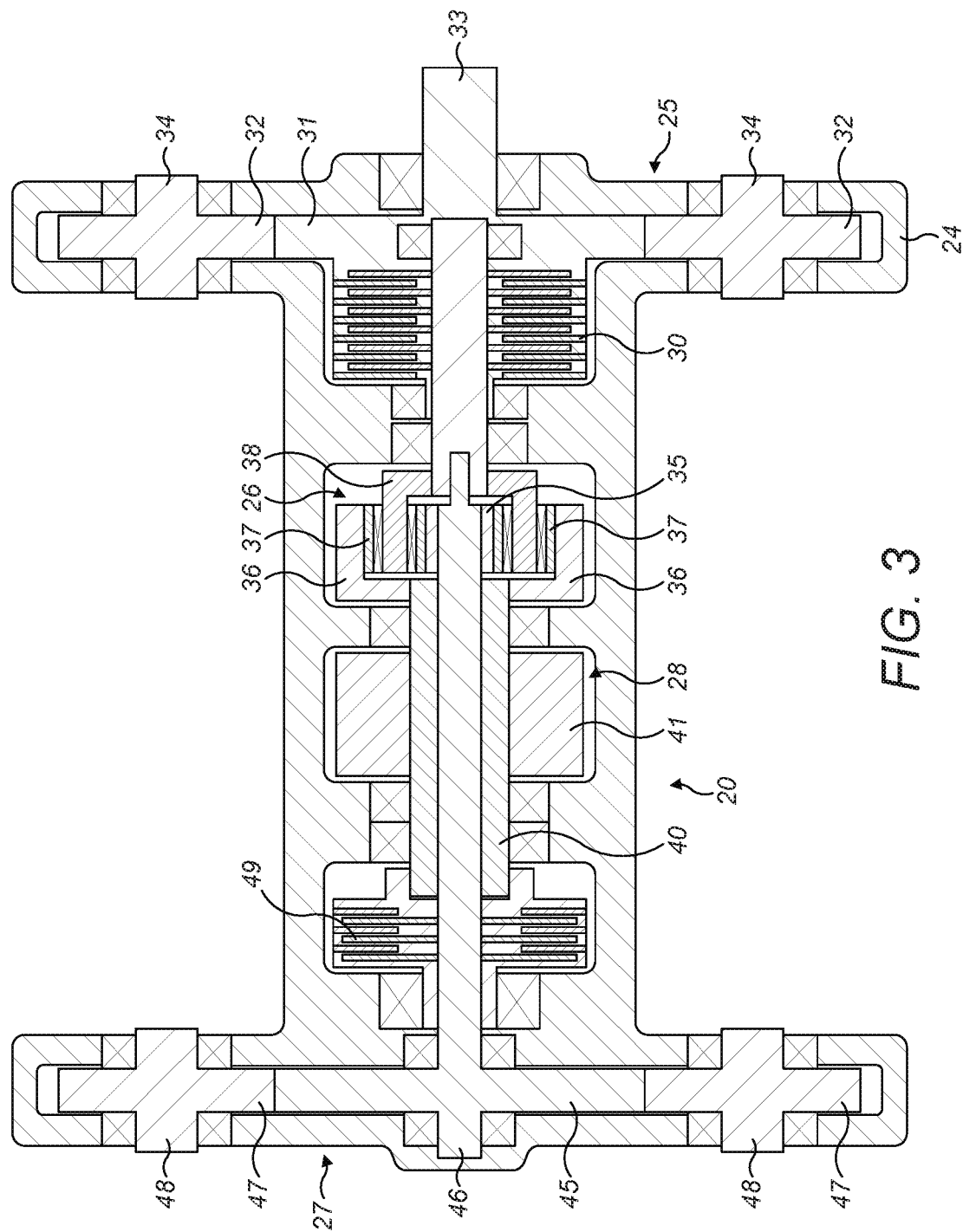
FIG. 3 is a cross-sectional view of a side elevation of a transmission system of the propulsion system of FIG. 2.

As shown in further detail in FIGS. 2 and 3, the propulsion system 11 may comprise a power unit 17, a power transfer system 18 and a propulsion output arrangement 19, all of which may operably interconnected by a transmission system 20. The transmission system 20 may selectively receive power from the power unit 17 and/or the power transfer system 18 and may selectively supply power to the propulsion output arrangement 19.

The power unit 17 may be configured to provide a power output in the form of a rotating power unit output shaft 21, which may be operably connected to the transmission system 20. The power unit 17 may be of any suitable type, for example an internal combustion engine (particularly a diesel engine) or a gas turbine. The power unit 17 may be capable of providing a variable power output at a range of speeds or at a constant speed. The propulsion system 11 may comprise a plurality of power units 17 operably connected together and providing power to the transmissions system 20.

The transmission system 20 may comprise a power unit transmission 25, a summation transmission 26 operably connected to the power unit transmission 25, a power transfer transmission 27 operably connected to the summation transmission 26 and a propulsion output transmission 28 operably connected to the summation transmission 26 and/or power transfer transmission 27. As illustrated in FIG. 2, the power unit transmission 25, summation transmission 26, power transfer transmission 27 and propulsion output transmission 28 may be mounted in a gearbox 24.

The power unit transmission 25 may be configured to receive the power output from the power unit 17 and transfer the power to the power transfer system 18 and/or the summation transmission 26. The power unit transmission 25 may comprise a power unit coupler 30 located between and configured to selectively connect the power unit output shaft 21 and the summation transmission 26. The power unit coupler 30 may be controlled by a control unit (not shown in the Figures) and may comprise a plate clutch as illustrated in FIG. 3. The power unit coupler 30 may alternatively comprise a clutch, dog clutch, torque converter or the like.

The power unit transmission 25 may further comprise at least one first power unit transmission gear 31 and at least one second power unit transmission gear 32 for transferring power from the power unit output shaft 21 to the power transfer system 18. In the illustrated embodiment the first power unit transmission gear 31 is mounted to a first power unit transmission shaft 33, which may be the power unit output shaft 21 as illustrated, and interconnects with two second power unit transmission gears 32. Each second power unit transmission gear 32 may be mounted to a second power unit transmission shaft 34 and the power transfer system 18 may be mounted to the second power unit transmission shaft 34.

The summation transmission 26 may be of any suitable type known in the art, for example automatic, continuously variable and the like, which is configured to receive two power inputs (from the power unit transmission 25 and power transfer transmission 27) and provide at least one output (via the propulsion output transmission 28 and/or power transfer transmission 27). The summation transmission 26 may be substantially similar to that disclosed in WO-A-2014/184517 and, as shown in FIGS. 2 and 3, may comprise a planetary gearbox or epicyclic gearing having a plurality of rotatable gears that transfer power in the same plane. The summation transmission 26 may comprise a sun gear 35 encircled by a ring gear 36. The ring gear 36 may comprise inward facing teeth around the inner edge of an annular disc. A plurality of planetary gears 37 may be located between and mesh with the sun gear 35 and ring gear 36. The plurality of planetary gears 37 may be attached about their axles to a carrier 38. The carrier 38 may be operably connected to the power unit 17 via the power unit transmission 25. In particular, the power unit coupler 30 may be configured to selectively connect the carrier 38 to the power unit output shaft 21 and/or first power unit transmission shaft 33. The ring gear 36 may provide the output to the propulsion output transmission 28.

The propulsion output transmission 28 may comprise a first propulsion output shaft 40 operably connected to the ring gear 36 and a first propulsion output gear 41 mounted to the first propulsion output shaft 40. In particular, as shown, the first propulsion output shaft 40 may be directly connected to the ring gear 36 such that they rotate together by virtue of the ring gear 36 being mounted around the first propulsion output shaft 40. The propulsion output transmission 28 may further comprise a second propulsion output gear 42 mounted to a second propulsion output shaft 43. The first and second propulsion output gears 41, 42 mesh such that when the ring gear 36 rotates the first propulsion output shaft 40, the first propulsion output gear 41 rotates the second propulsion output gear 42 and the second propulsion output shaft 43.

The second propulsion output shaft 43 may be configured to provide power to the propulsion output arrangement 19, which may comprise the propulsion element 12. The propulsion element 12 may be operably connected to the second propulsion output shaft 43, for example by being mounted thereon, such that the propulsion element 12 provides thrust to move the marine vessel 10. The propulsion element 12 may comprise one or more propellers, thrusters, wheels and other forms of moving a vehicle. The propulsion output arrangement 19 may be configured to receive power from the summation transmission 26 and/or power transfer transmission 27 such that the propulsion output shaft 23 and propulsion element 12 rotate, thereby moving the marine vessel 10.

The power transfer transmission 27 may be configured to transfer power between the power transfer system 18 and the summation transmission 26 and/or transfer power between the power transfer system 18 and the propulsion output transmission 28. The power transfer transmission 27 may comprise at least one first power transfer gear 45 mounted to a first power transfer shaft 46 and at least one second power transfer gear 47 mounted to at least one second power transfer shaft 48. The at least one second power transfer shaft 48 may be mounted to the power transfer system 18 to transfer power therewith. The sun gear 35 may be mounted to the first power transfer shaft 46 such that they rotate together, thereby operably connecting the power transfer transmission 27 to the summation transmission 26.

The power transfer transmission 27 may further comprise a power transfer coupler 49 configured to operably connect the power transfer system 18 and the propulsion output transmission 28 such that power can be transferred directly from the power transfer system 18 to the propulsion output arrangement 19 independently of the summation transmission 26. The power transfer coupler 49, first power transfer shaft 46 and first propulsion output shaft 40 may be located on the same side of the summation transmission 26. The first propulsion output gear 41 may be mounted to the first propulsion output shaft 40 between the power transfer coupler 49 and the ring gear 36. In particular, the power transfer coupler 49 may be configured to selectively connect the first power transfer shaft 46 and the first propulsion output shaft 40 and may be at least partially mounted to the first power transfer shaft 46 and the first propulsion output shaft 40. The power transfer coupler 49 may be controlled by the control unit.

As shown in FIG. 3, the first power transfer shaft 46 may be mounted within the first propulsion output shaft 40. In particular, the first propulsion output shaft 40 may be substantially hollow and the first power transfer shaft 46 may extend through the first propulsion output shaft 40 from the power transfer coupler 49 to the sun gear 35. The power transfer coupler 49 may comprise a plate clutch in which a plurality of plates are mounted to the first propulsion output shaft 40 and a plurality of plates are mounted to the first power transfer shaft 46. The power transfer coupler 49 may alternatively comprise a clutch, dog clutch, torque converter or the like.

The power transfer system 18 may comprise at least one first energy conversion machine 50, at least one second energy conversion machine 51 and at least one power transfer arrangement 52 for transferring power between the at least one first and second energy conversion machines 50, 51. The power transfer system 18 may, for example, be electric or hydraulic. The at least one first energy conversion machine 50 may be operably connected to the power unit transmission 25 for transferring power between the at least one first energy conversion machine 50, the power unit 17 and the summation transmission 26. The at least one second energy conversion machine 51 may be operably connected to the power transfer transmission 27 for transferring power between the at least one second energy conversion machine 51, the propulsion output transmission 28 and the summation transmission 26. In the embodiment illustrated in FIG. 2, the power transfer system 18 comprises two first energy conversion machines 50, each operably connected to a second power unit transmission shaft 34, and two second energy conversion machines 51, each operably connected to a second power transfer shaft 48.

The propulsion system 11 may comprise two power transfer arrangements 52 as illustrated, each power transfer arrangement 52 connecting a pair of first and second energy conversion machines 50, 51. In alternative embodiments the power transfer system 18 may comprise a single power transfer arrangement 52 connecting all of the first and second energy conversion machines 50, 51 together. The at least one power transfer arrangement 52 may be operable provide power to a house load, operator quarters 13, bow thrusters 14, stern thrusters 15, crane 16 and the like.

The first and second energy conversion machines 50, 51 may comprise any suitable means for reversibly or bi-directionally converting or transferring energy. In particular, the first and second energy conversion machines 50, 51 may be suitable for converting one form of energy, particularly mechanical, into another, particularly electric or fluid, and vice-versa. The power transfer arrangements 52 may also enable the power transferred between the first and second energy conversion machines 50, 51 to be controlled. For example, the power transfer may be controlled such that the input speed to the first energy conversion machines 50 may be different to the output speed of the second energy conversion machines 51.

The first and second energy conversion machines 50, 51 and power transfer arrangement(s) 52 may together form a variator. In particular, the variator may enable the stepless variation of the ratio between input and output. The variator may be bi-directional, such that the power input may be to the first energy conversion machine 50 and the power output may be from the second energy conversion machine 51 or vice-versa.

The first and second energy conversion machines 50, 51 may be reversible hydraulic machines (i.e. pump/motors), such as variable displacement hydraulic motors and the like. Reversible hydraulic machines convert mechanical energy from a rotating shaft into fluid energy and vice-versa. Alternatively, the first and second energy conversion machines 50, 51 may each comprise a hydraulic pump and a hydraulic motor arranged in parallel such that each can act synchronously or independently. The power transfer arrangement 52 may comprise a hydraulic system for transferring hydraulic fluid, and thereby energy or power, between the first and second reversible hydraulic machines. The hydraulic system may comprise any suitable arrangement known in the art, for example comprising hoses, pumps, motors, valves, reservoirs, filters, accumulators, seals, connections, charge pumps, charge circuits and/or the like.

Alternatively, the first and second energy conversion machines 50, 51 may be reversible electric machines, such as a reversible electric motor or generator and the like. Reversible electric machines convert mechanical energy from a rotating shaft into electric energy and vice-versa. The reversible electric machines may be DC or AC and may be of any suitable type, for example asynchronous, synchronous, switch reluctance and variable frequency induction motors. The power transfer arrangement 52 may comprise an electrical system for transferring electric current, and thereby energy or power, between the first and second reversible electric machines. The electrical system may be of any suitable arrangement known in the art, for example comprising inverters, rectifiers, cables, isolators, batteries, power control electronics and the like.

Alternatively, the first and second energy conversion machines 50, 51 may be reversible mechanical machines, such a continuous variable transmission, including toroidal, push belt or friction cone transmissions. The power transfer arrangement 52 may comprise at least one shaft, gear, clutch, belt, chain or other mechanical means for transferring power between the first and second energy conversion machines 50, 51.

The input or output speed of the first and second energy conversion machines 50, 51 may be controlled by the control unit. In particular, the control unit may disengage the operable connection between the first and second energy conversion machines 50, 51 and power unit and power transfer transmission 25, 27 by switching the first and second energy conversion machines 50, 51 such that no power is transmitted therethrough. For example, if the first and second energy conversion machines 50, 51 are variable displacement hydraulic motors, a swash plate contained therein may be rotated such that power is not transferred. Alternatively, a coupler, such as a clutch, may be located between the first and second energy conversion machines 50, 51 and power unit and power transfer transmission 25, 27 to enable engagement and disengagement of the operably connections therebetween.

Modes of Operation

The propulsion system 11 may comprise at least one input device and/or at least one sensor configured to provide at least one input to the control unit. Based upon the inputs and stored program instructions the control unit may control the power unit 17, power transfer system 18 and transmission system 20 (particularly the power unit coupler 30 and power transfer coupler 49) to operate the propulsion system 11. The control unit may determine a desired angular velocity of the output of the propulsion element 12 (referred to as "system output speed"), for example based upon an input from an operator at an input device, and control the propulsion system 11 in order to achieve the desired system output speed. In particular, the control unit may determine whether to engage or disengage the power unit and/or power transfer couplers 30, 49 and subsequently engage of disengage the power unit and/or power transfer couplers 30, 49. The control unit may also change the output speed of the power unit 17 and/or the transfer of power across the power transfer system 18.

The propulsion system 11 may be operated in one of a plurality of different modes. Some of the modes are similar to those disclosed in WO-A-2014/184517.

In a mechanical mode a mechanical route may be utilised for transferring power from the power unit 17 to the propulsion output transmission 28. The power unit coupler 30 may be engaged such that the rotating power unit output shaft 21 drives the carrier 38 and thereby the planetary gears 37. The ring gear 36 therefore rotates, driving the first propulsion output gear 41 via the first propulsion output shaft 40. The first energy conversion machines 50 do not provide power to the power unit transmission 25, although the first energy conversion machines 50 may be operated as a power generator to receive power from the power unit transmission 25 via the rotating first and second power unit transmission gears 31, 32 and second power unit transmission shafts 34. The first energy conversion machines 50 may thereby provide power to the power transfer arrangements 52 for a hotel load or the like.

In a first mechanical range of system output speeds, which may be from 25% to 75% of maximum system output speed, the mechanical mode the sun gear 35 may be prevented from rotation in order to reduce losses during operation. For example, the transmission system 20 may comprise a coupler or clutch (such as between the first power transfer shaft 46 and casing of the gearbox 24) to prevent rotation of the sun gear 35 in the mechanical mode. This clutch may be part of the power transfer coupling 49. Alternatively, the second energy conversion machines 51 may be prevented from rotation by holding their speed at zero.

In a second mechanical range of system output speeds, which may be lower than those of the first mechanical range or from 25% to 50% of maximum system output speed, the sun gear 35 may be allowed to rotate by locking the power transfer coupler 49 and operating the second energy conversion machines 51 such that it does not provide power to the power transfer arrangements 52. For example, in the case of a hydraulic motor the swash plate may be set to zero displacement or in the case of an electric motor it may free wheel without any excitation current.

In a neutral mode, power may be transferred from the power unit 17 to the propulsion output transmission 28 via the power transfer system 18, but not through the power unit coupler 30. In particular, the power unit coupler 30 may be disengaged and power may be transferred non-mechanically only via the power transfer system 18. The power transfer coupler 49 may be disengaged such that the first power transfer shaft 46 is not directly mechanically connected to the first propulsion output shaft 40. The first energy conversion machines 50 may be operated as a power generator to receive power from the power unit transmission 25 and transfer the power to the second energy conversion machines 51 via the power transfer arrangements 52. The second energy conversion machines 51 may be operated as a motor to provide power to the power transfer transmission 27, particularly to the second power transfer shafts 48. The second power transfer shafts 48 may transfer power to the first power transfer shaft 46 via the first and second power transfer gears 45, 47. However, power may not be transferred through the summation transmission 26 to the ring gear 36 and may instead be absorbed by the planetary gears 37 and carrier 38.

In an alternate power mode, power may be transferred from the power unit 17 to the propulsion output transmission 28 via the power transfer system 18, but not through the power unit coupler 30 or through the summation transmission 26. The power transfer coupler 49 may be engaged such that the first power transfer shaft 46 is directly mechanically connected to the first propulsion output shaft 40 and they rotate in the same direction at the same angular velocity. Although the ring gear 36 and sun gear 35 may rotate in this mode, power is transferred from the first power transfer shaft 46 to the first propulsion output shaft 40 directly by virtue of the power transfer coupler 49.

In an indirect combined power mode, power may be transferred from the power unit 17 to the propulsion output transmission 28 via a combination of the mechanical mode and alternate power modes. The power unit coupler 30 may be engaged such that the power unit 17 directs power to the carrier 38. The power unit transmission 25 may also provide power to the power transfer system 18, which may be configured to control the angular velocity of the sun gear 35 by controlling the angular velocity of the output of the second energy conversion machines 51. The power transfer coupler 49 may be disengaged.

Therefore, the ring gear 36 may be driven by both the power transfer system 18 and power unit 17 directly and provides power to the propulsion output transmission 28. In the indirect combined power mode it is possible to vary the angular velocity of the ring gear 36 by either varying the output speed of the power unit 17 or by varying the output speed of the second energy conversion machines 51. Furthermore, the direction of rotation of the sun gear 35 may be controlled to alter the angular velocity of the ring gear 36, by controlling the direction of rotation of the output of the second energy conversion machines 51 and second power transfer shafts 48.

In a direct combined power mode, power may be transferred in a similar manner to that of the indirect combined power mode, except that the power transfer coupler 49 may be engaged. Therefore, the propulsion output transmission 28 may receive power from the power transfer system 18 via the power transfer coupler 49 and from the power unit 17 via the power unit coupler 30.

In an indirect reverse power mode, power may be transferred as in the mechanical mode whilst the second energy conversion machines 51 operate as power generators. The power transfer coupler 49 may be disengaged. The power unit 17 may provide power to the ring gear 36 (and thus the propulsion output arrangement 19) and the sun gear 35 via the engaged power unit coupler 30, carrier 38 and planetary gears 37. The second energy conversion machines 51 may receive power from the sun gear 35 via the first and second power transfer shafts 46, 48 and first and second power transfer gears 45, 47. The angular velocity of the sun gear 35 may be controlled by controlling the power generated by the second energy conversion machines 51. In the indirect reverse power mode the power transfer system 18 may also provide power to the power unit transmission 25 via the first energy conversion machines 50.

In a direct reverse power mode, the propulsion system 11 may operate as in the indirect reverse power mode except that the power transfer coupler 49 may be engaged. Therefore, power may be directed from the ring gear 36 to the second energy conversion machine 51 directly via the power transfer coupler 49.

Each of the modes may be operated at any suitable time during operation of the marine vessel 10. A particularly suitable sequence of operation for the increasing the system output speed is described hereinbelow. The sequence is similar to that disclosed in WO-A-2014/184517. Initially, the system output speed may be increased from zero by implementing the alternate power mode, in which the power unit coupler 30 is disengaged and the power transfer coupler 49 is engaged, and increasing the output speed of the power unit 17 to its optimum output speed. The optimum output speed may be the maximum of the power unit 17 and/or the output speed at which the power unit 17 operates most efficiently.

When at the optimum output speed of the power unit 17, the indirect reverse power mode may be implemented by engaging the power unit coupler 30 and operating the second energy conversion machines 51 as energy generators. To increase the system output speed the input speed of the second energy conversion machines 51 may be reduced, such that the rotational velocity of the sun gear 35 reduces and the rotational velocity of the ring gear 36 increases.

Once the speed of the second energy conversion machines 51 reach zero (i.e. such that the sun gear 35 is no longer rotating), the propulsion system 11 may be operated in the mechanical mode (whether the first or second mechanical ranges discussed above). The system output speed is preferably cruising speed (i.e. the speed at which the marine vessel 10 operates for the majority of its operational envelope) when the transmission system 20 is in this state.

To yet further increase system output speed, the indirect combined power mode may be engaged by operating the second energy conversion machines 51 as motors and in an opposite rotational direction to their rotational direction during the indirect reverse power mode and indirect alternate power mode. As a result, the rotational speed of the ring gear 36 increases and the system output speed increases yet further.

In order to decrease system output speed the reverse of the aforementioned sequence of modes may be implemented. The alternate power mode may be implemented such that the summation transmission 26 is bypassed. Therefore, any inefficiencies in the summation transmission 26 may be avoided. Furthermore, the alternate power mode may provide added redundancy in case of failures in the summation transmission 26.

Alternative Embodiments

Various other embodiments also fall within the scope of the present disclosure. In general, instead of interlocking or meshed gears, the propulsion system 11 may comprise any suitable kinematic connection elements, including belts and/or chains.

In the embodiment of FIGS. 2 and 3 the rotational direction of the propulsion element 12 may be reversed by either reversing the rotational direction of the power unit 17 and/or by reversing the rotational direction of the at least one second energy conversion machine 51. In alternative embodiments the transmission system 20 may be configured such that the mechanical connection between the at least one power unit 17 to the summation transmission 26, particularly via the power unit transmission 25, is selectively reversible between first and second rotational directions. As a result, the rotational output direction of the propulsion element 12 may be reversible.

Figure 4:
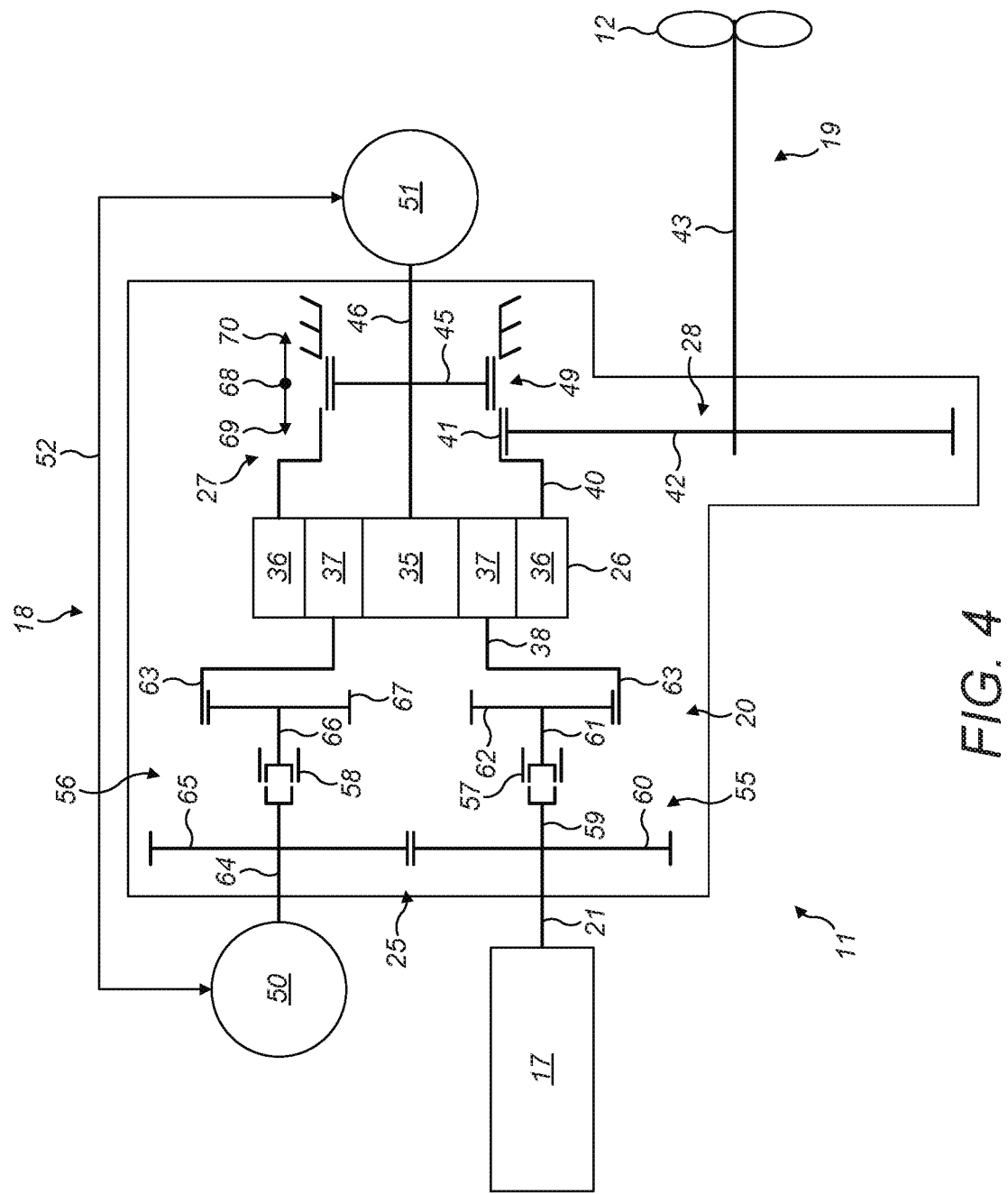
FIG. 4 is a schematic of a further embodiment of a propulsion system of the present disclosure.

FIG. 4 illustrates one such embodiment in which the power unit transmission 25 and power transfer transmission 27 differ to those in FIGS. 2 and 3. The same reference numerals have been used where appropriate. The power unit transmission 25 may comprise a primary power unit transmission 55 for selectively rotating the input to the summation transmission 26 in the first rotational direction and a secondary power unit transmission 56 for selectively rotating the input to the summation transmission 26 in the opposing second rotational direction. The first and second rotational directions can be implemented for a single rotational input direction from the power unit output shaft 21. The primary and secondary power unit transmissions 55, 56 may comprise primary and secondary power unit transmission couplings 57, 58 respectively for selectively operably connected the primary or secondary power unit transmission 55, 56 to the carrier 38.

The primary power unit transmission 55 may comprise a first power unit transmission shaft 59 to which a first power unit transmission gear 60 may be mounted and a second power unit transmission shaft 61 to which a second power unit transmission gear 62 may be mounted. The first and second power unit transmission shafts 59, 61 may be operably connectable to one another via the primary power unit transmission coupling 57. The second power unit transmission gear 62 may be meshed with a carrier gear 63. The carrier gear 63 may be an internal gear and may be configured to rotate the carrier 38 in the first rotational direction upon rotation of the second power unit transmission gear 62.

The secondary power unit transmission 56 may comprise a third power unit transmission shaft 64 to which a third power unit transmission gear 65 may be mounted and a fourth power unit transmission shaft 66 to which a fourth power unit transmission gear 67 may be mounted. The third power unit transmission gear 65 may be meshed with the first power unit transmission gear 60 to transfer power therebetween. The first energy conversion machine 50 may be mounted to the third power unit transmission shaft 64. The third and fourth power unit transmission shafts 64, 66 may be operably connectable to one another via the secondary power unit transmission coupling 58. The fourth power unit transmission gear 67 may be meshed with the carrier gear 63. The carrier gear 63 may be configured to rotate the carrier 38 in the second rotational direction upon rotation of the fourth power unit transmission gear 67.

When the primary power unit transmission coupling 57 is engaged and the secondary power unit transmission coupling 58 is disengaged the at least one power unit 17 may drive the carrier 38 in the first rotational direction via the primary power unit transmission 55. When the primary power unit transmission coupling 57 is disengaged and the secondary power unit transmission coupling 58 is engaged the at least one power unit 17 may drive the carrier 38 in the second rotational direction, which is opposite to the first rotational direction, via the secondary power unit transmission 56. As a result, the rotational direction of the first propulsion output shaft 40, and thus the rotational direction of the propulsion element 12, may be controlled in the aforementioned modes.

In the embodiment of FIG. 4 the power transfer transmission differs from that of FIGS. 2 and 3 because the power transfer coupler 49 comprises three operational states. Furthermore, the second energy conversion machine 51 is directly mounted to the first power transfer shaft 46. In a neutral configuration 68, as shown in FIG. 4, the power transfer coupler 49 may be disengaged such that the second energy conversion machine 51 is operably connected only to the sun gear 35, as in the neutral, indirect combined and indirect reverse power modes discussed above. In an engaged configuration 69, the first power transfer shaft 46 may be operably connected to the first propulsion output shaft 40, as in the alternate, direct combined and direct reverse power modes discussed above. In a brake configuration 70 the first power transfer shaft 46 may be prevented from rotation such that the sun gear 35 cannot rotate. The brake configuration 70 may be implemented when in the mechanical mode such that power is not transferred between the sun gear 35 and second energy conversion machine 51, thereby ensuring the efficient mechanical transfer of power from the power unit 17 to the first propulsion output shaft 40.

Figure 5:
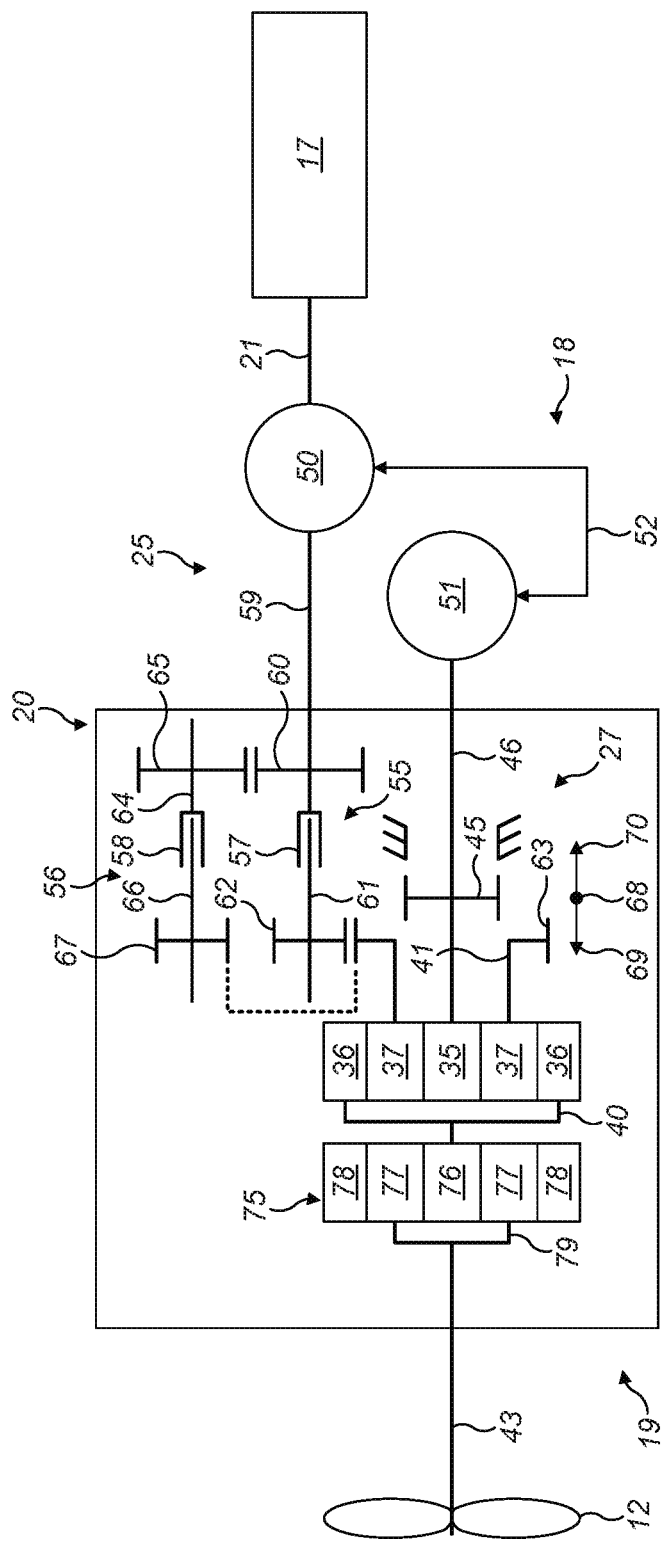
FIG. 5 is a schematic of a further embodiment of a propulsion system of the present disclosure.

FIG. 5 illustrates a further embodiment of the propulsion system 11 in which the power unit transmission 25 is similar to that of FIG. 4, except that the carrier gear 63 is an external gear meshed with the second and fourth power unit transmission gears 62, 67. In FIG. 5 the secondary power unit transmission 56 is illustrated as being located above or next to the primary power unit transmission 55. However, instead, the primary and secondary power unit transmissions 55, 56 may be mounted directly around the carrier gear 63. A benefit of such an arrangement is that the offset, whether vertical or horizontal, between the power unit output shaft 21 and the sun gear 35 may be increased compared to that of the arrangement of FIG. 4. This increased offset may be particularly suitable for some types of marine vessels 10.

FIG. 5 also illustrates a further embodiment of the power unit transmission 25 in which the first energy conversion machine 50 may be mounted directly to the power unit output shaft 21 rather than to any other shaft of the power unit transmission 25. The power unit output shaft 21 may pass directly through the first energy conversion machine 50. As a result, the propulsion system 11 may be more compact by virtue of the zero horizontal or vertical offset between the power unit 17 and first energy conversion machine 50.

FIG. 5 also illustrates a further embodiment of the power unit coupler 49, which is similar to that of FIG. 4 except that the power transfer transmission 27 is similar to that disclosed in WO-A-2014/184517. In such a propulsion system 11 the power transfer coupler 49 may implement the neutral and brake configurations 68, 70 in a similar manner to that of FIG. 4. However, in the engaged configuration 69 the power transfer coupler 49 may be configured to selectively operably connect the second energy conversion machine 51 to the carrier 38 rather than to the ring gear 36. As a result, in the engaged configuration 69 the summation transmission 26 may not be bypassed and the alternate, combined and reverse power modes cannot be implemented.

FIG. 5 also illustrates a further embodiment of the propulsion output transmission 28 in which an output planetary gearbox 75 replaces the first and second propulsion output gears 41, 43. The output planetary gearbox 75 may comprise an output sun gear 76 operably connected to the first propulsion output shaft 40 and the ring gear 36 of the summation transmission 26. The output planetary gearbox 75 may further comprise a plurality of output planetary gears 77 located between the output sun gear 76 and an output ring gear 78. The output planetary gears 77 may be mounted to an output carrier 79, which may provide a power output to the second propulsion output shaft 43 to which the propulsion element 12 is mounted. The output planetary gearbox 75 may be configured to provide an additional reduction ratio between the power unit output shaft 21 speed and system output speed. As a result, the summation transmission 26 may have a smaller diameter and the power density of the propulsion system 11 may be increased.

Figure 6:
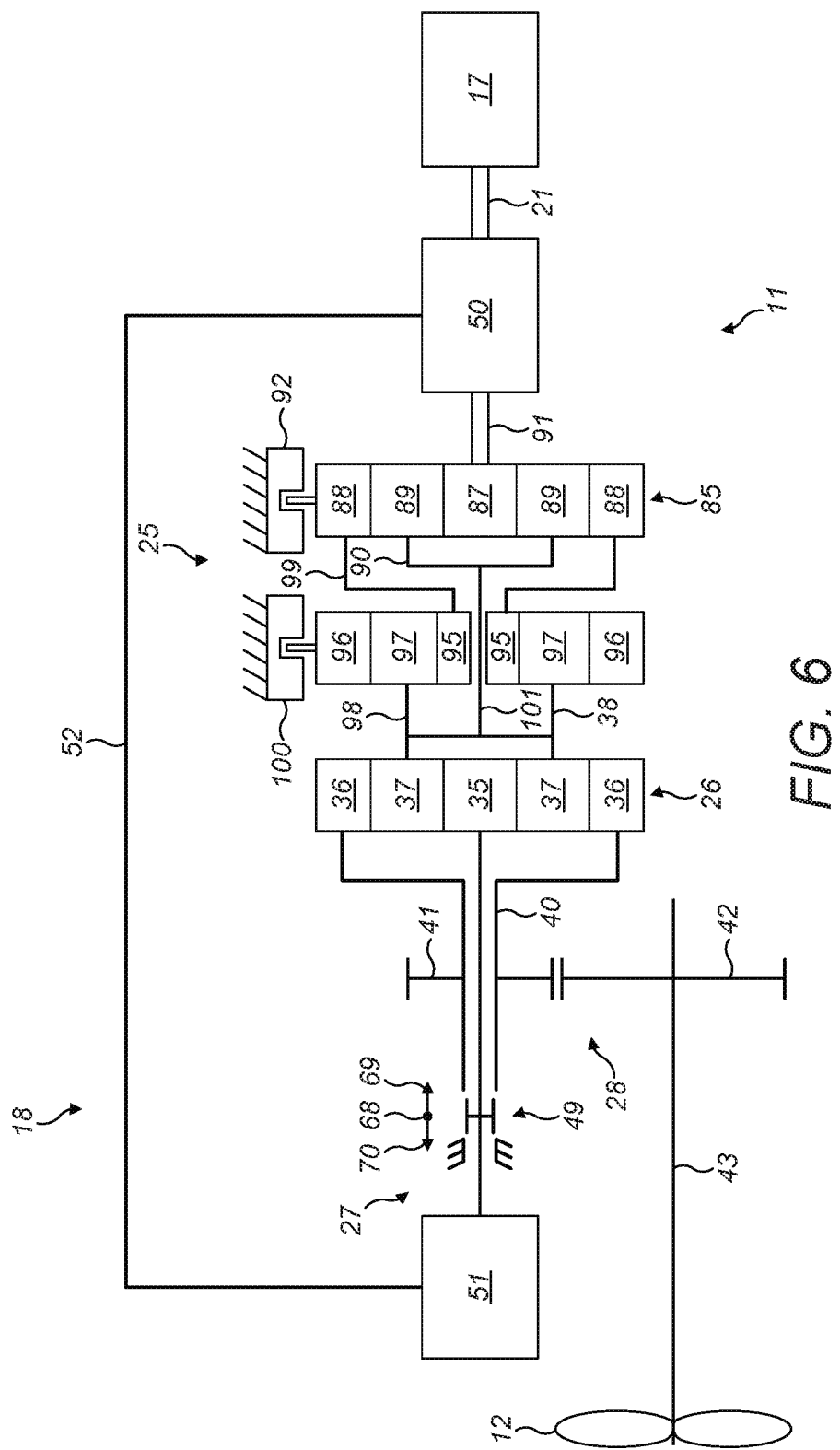
FIG. 6 is a schematic of a further embodiment of a propulsion system of the present disclosure.
Figure 7:
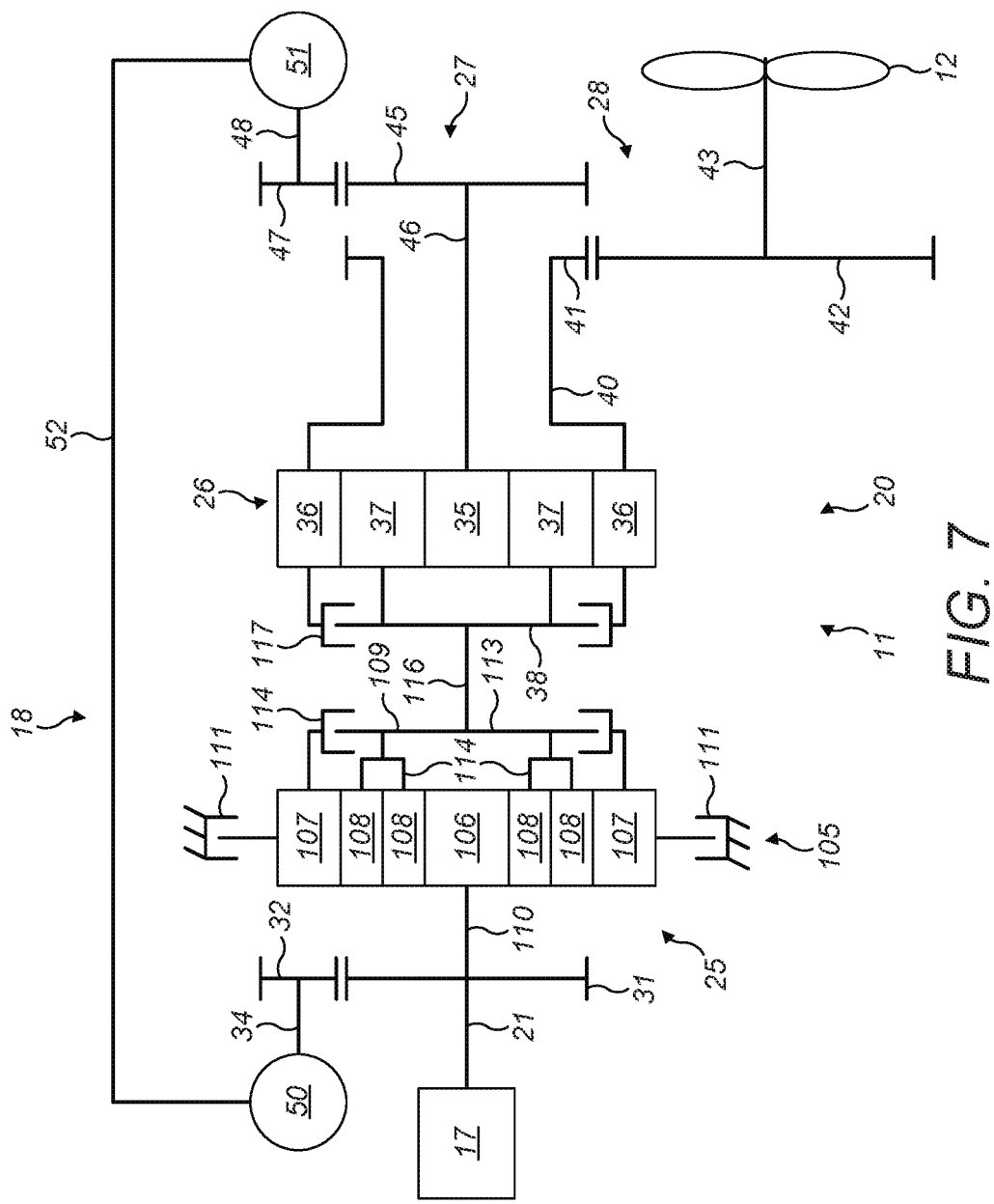
FIG. 7 is a schematic of a further embodiment of a propulsion system of the present disclosure.

FIGS. 6 and 7 illustrate further embodiments of the propulsion system 11 in which the power unit transmission 25 comprises at least one planetary gearbox 85, 86, 105 for providing a selectively reversible rotational power input to the carrier 38 of the summation transmission 26. In particular, as illustrated in FIG. 6, the power unit transmission 25 may comprise a first planetary gearbox 85 comprising a first input sun gear 87, a first input ring gear 88, a first plurality of input planetary gears 89 meshed between the first input sun gear 87 and the first input ring gear 88 and a first input carrier 90 to which the first plurality of input planetary gears 89 are rotatably mounted. The first input sun gear 87 is operably connected to the power unit output shaft 21 and/or a first power unit transmission shaft 91 that receives power from the power unit 17. In FIG. 6 the first energy conversion machine 50 is mounted to the power unit output shaft 21 and/or first power unit transmission shaft 91, but in other embodiments it may receive power from the power unit 17 via a gear arrangement as disclosed in FIGS. 2 and 3. The first planetary gearbox 85 may further comprise a first ring coupler 92 for selectively locking or braking the first input ring gear 88 to prevent the first input ring gear 88 from rotating. The first ring coupler 92 may comprise a clutch and may, in particular, comprise a plate clutch.

The power unit transmission 25 may further comprise a second planetary gearbox 86 comprising a second input sun gear 95, a second input ring gear 96, a second plurality of input planetary gears 97 meshed between the second input sun gear 95 and the second input ring gear 96 and a second input carrier 98 to which the second plurality of input planetary gears 97 may be rotatably mounted. The second input sun gear 95 may be operably connected to, and therefore rotate with, the first input ring gear 88 by a second power unit transmission shaft 99. The second planetary gearbox 86 may further comprise a second ring coupler 100 for selectively locking or braking the second input ring gear 96 to prevent the second input ring gear 96 from rotating. The second ring coupler 100 may comprise a clutch and may, in particular, comprise a plate clutch.

The power unit transmission 25 may further comprise a third power unit transmission shaft 101 operably connecting the first input carrier 90 to the second input carrier 98 and carrier 38 of the summation transmission 26 such that they rotate together. As illustrated, the third power unit transmission shaft 101 may extend through the second input sun gear 95.

In order to reverse the rotational direction of the first propulsion output shaft 40, based upon a single rotational direction of the power unit output shaft 21, the first and/or second ring couplers 92, 100 may be selectively engaged or disengaged. In order to drive the first propulsion output shaft 40 in a first rotational direction the first ring coupler 92 may be engaged and the second ring coupler 100 disengaged. Therefore, the first input ring gear 88 and second input sun gear 95 may not rotate whilst power is transferred from the first input sun gear 87, through the first plurality of input planetary gears 89, through the first input carrier 90, through the third power unit transmission shaft 101 and to the carrier 38 of the summation transmission 26. The carrier 38 may rotate in the first rotational direction and the summation transmission 26 operates as disclosed above.

In order to drive the first propulsion output shaft 40 in a second rotational direction the first ring coupler 92 may be disengaged and the second ring coupler 100 engaged such that the second input ring gear 96 cannot rotate. In a similar manner to the first rotational direction, power may be transferred from the first input sun gear 87, through the first plurality of input planetary gears 89, through the first input carrier 90, through the third power unit transmission shaft 101 and to the carrier 38 of the summation transmission 26. However, as the first input ring gear 88 rotates, the second power unit transmission shaft 99 may drive the second input sun gear 95 in a direction that, via the second plurality of input planetary gears 97, causes the second input carrier 98 and thus carrier 38 to rotate in the second rotational direction.

In order to prevent the transfer of power from the power unit 17 to the summation transmission 26 (i.e. perform the function of the power unit coupling 30 of the embodiment of FIG. 2), the first and second ring couplers 92, 100 may be disengaged. As a result, any power output from the power unit 17 may result in the freewheeling of the first and second planetary gearboxes 85, 86 without the transfer of power to the summation transmission 26.

In the embodiment of FIG. 7 the power unit transmission 25 comprises a single reversible planetary gearbox 105 for providing a selectively reversible input to the summation transmission 26. Where applicable, the same reference numerals have been used in FIG. 7 as those used in FIGS. 2 and 6. The reversible planetary gearbox 105 may comprise an input sun gear 106, an input ring gear 107, a plurality of input planetary gears 108 meshed between the input sun gear 106 and the input ring gear 107 and an input carrier 109 to which the plurality of input planetary gears 108 may be rotatably mounted. The input sun gear 106 may be operably connected to the power unit output shaft 21 and/or a first power unit transmission shaft 110 that receives power from the power unit 17. The reversible planetary gearbox 105 may further comprise a first coupler 111 for selectively locking or braking the input ring gear 106 to prevent the input ring gear 106 from rotating. The first coupler 111 may comprise a clutch and may, in particular, comprise a plate clutch.

Figure 8:
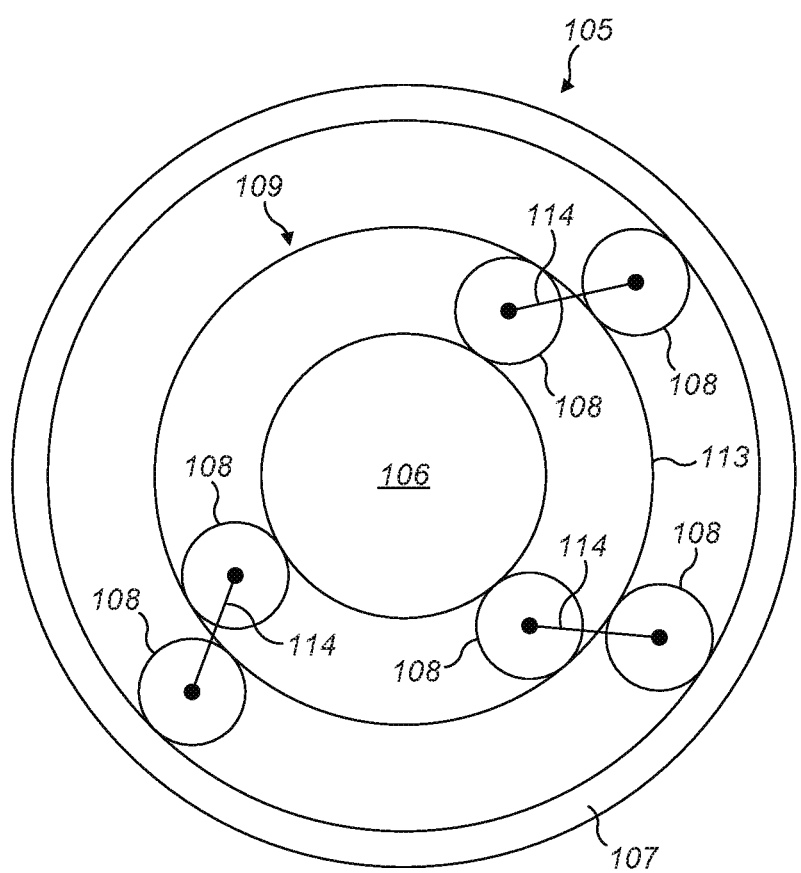
FIG. 8 is a schematic of a planetary gearbox of the propulsion system of FIG. 7.

The reversible planetary gearbox 105 may be a negative train planetary and may comprise a plurality of pairs of input planetary gears 108. As illustrated in further detail in FIG. 8, the input carrier 109 may comprise a primary carrier 113 and a plurality of secondary carriers 114 rotatably mounted to the primary carrier 113. Each pair of input planetary gears 108 may be rotatably mounted to a secondary carrier 114. Therefore, the primary carrier 113 may be operable to rotate relative to a stationary position, each secondary carrier 114 may be operable to rotate relative to the primary carrier 113 and each planetary gear 108 may be operable to rotate relative to the secondary carrier 114 to which it is attached.

The power unit transmission 25 may further comprise a second coupler 115 for selectively locking the input ring gear 107 to the input carrier 109 such that they rotate together. The input carrier 109, and particularly the primary carrier 113, may be operably connected to the carrier 38 of the summation transmission 26 by a second power unit transmission shaft 116. The power unit transmission 25 may further comprise a third coupler 117 for selectively locking the ring gear 36 and carrier 38 of the summation transmission 26 such that they rotate together.

When the first coupler 111 is unlocked and the second coupler 115 locked such that the input ring gear 107 and input carrier 109 rotate together, the second power unit transmission shaft 116 may rotate in the same direction as the power unit output shaft 21. When the first coupler 111 is locked and the second coupler 115 unlocked the second power unit transmission shaft 116 may rotate in the opposition direction to the power unit output shaft 21.

Figure 9:
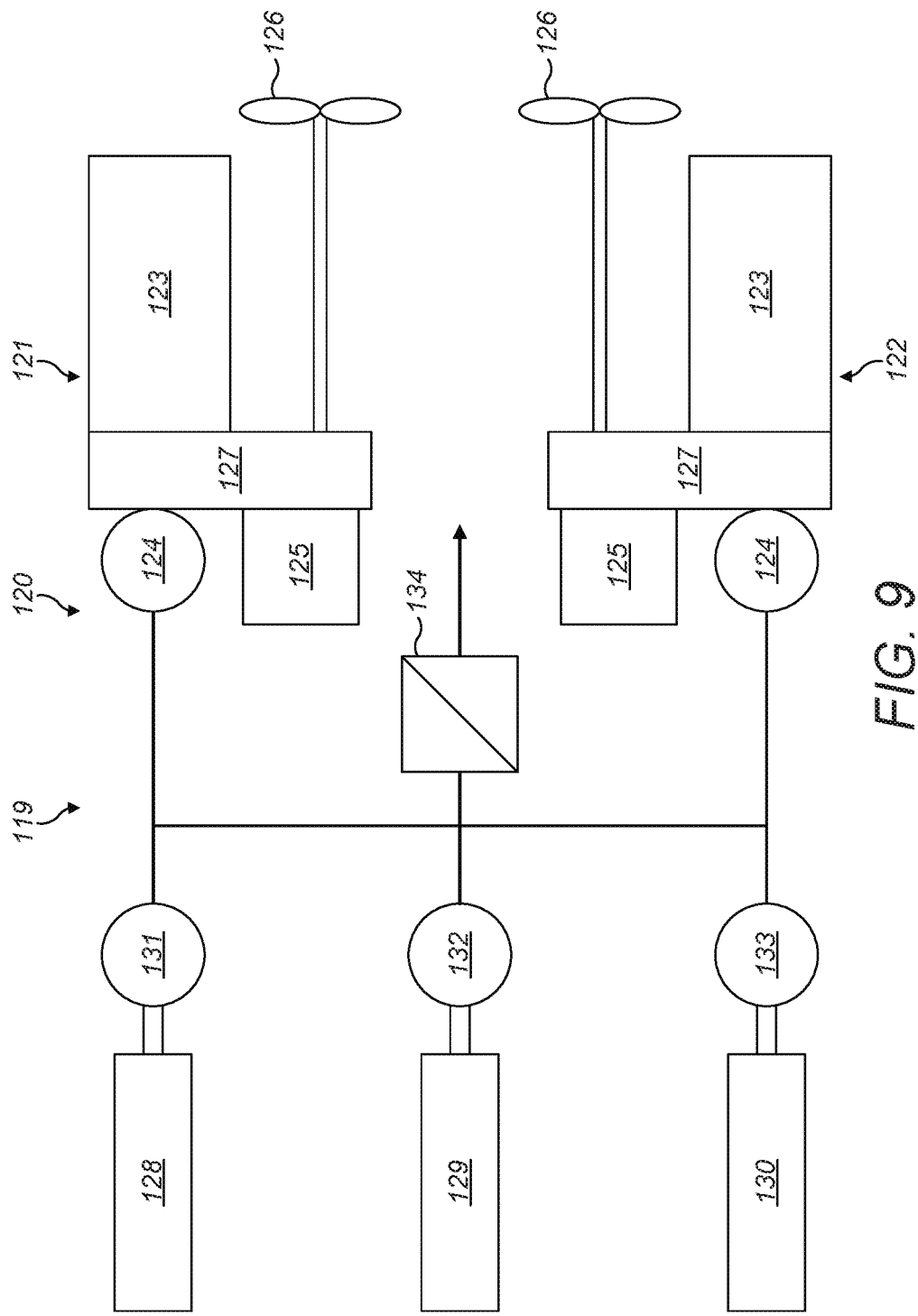
FIG. 9 is a schematic of a propulsion apparatus of the present disclosure.

FIG. 9 illustrates an embodiment of a propulsion apparatus 120 comprising a plurality of propulsion systems 121, 122 sharing a common power transfer system 119. The propulsion apparatus 120 may be located in a marine vessel 10 comprising two propulsion elements 12. In particular, the propulsion apparatus 120 may comprise a first propulsion system 121 and a second propulsion system 122, each comprising at least one primary power unit 123, at least one first energy conversion machine 124, at least one second energy conversion machine 125 and at least one propulsion element 126. Each of the first and second propulsion systems 121, 122 may further comprise a transmission system 127 configured to transfer power between the primary power unit 123, first energy conversion machine 124, second energy conversion machine 125 and propulsion element 126. Each transmission system 127 may be substantially the same as those described herein or as described in WO-A-2014/184517.

The propulsion apparatus 120 may further comprise first, second and third secondary power units 128, 129, 130. The propulsion apparatus 120 may comprise any number of primary and secondary power units 123, 128, 129, 130. In a particular embodiment the primary power units 123 may comprise gas turbines and the secondary power units 128, 129, 130 may comprise diesel generators. The primary power units 123 may be operable to provide power to a propulsion element 126 mechanically via the power transfer system 119 or hydraulically or electrically via the power transfer system 119 and transmission system 127. However, the secondary power units 128, 129, 130 may be operable to only provide power to a propulsion element 126 hydraulically or electrically via the power transfer system 119 and transmission systems 127.

In particular, the power transfer system 119 may comprise first, second and third power generators 131, 132, 133 operably connected to the outputs of the first, second and third secondary power units 128, 129, 130 respectively. The first, second and third power generators 131, 132, 133 may be configured to provide power to the power transfer system 119. The propulsion apparatus 120 may further comprise an energy supply 134 for providing power for a hotel load, operator quarters 13, bow thrusters 14, stern thrusters 15, crane 16 and the like. The power transfer system 119 may comprise a power transfer arrangement 135 connected to and configured to transfer power between the first, second and third power generators 131, 132, 133 and the first and second energy conversion machines 124, 125. The power transfer arrangement 135, first, second and third power generators 131, 132, 133 and first and second energy conversion machines 124, 125 may be of any form as described in respect of the first and second energy conversion machines 50, 51 and power transfer arrangement 52 as described above in respect of FIGS. 2 to 8.

The propulsion apparatus 120 may be operated to maximise the efficiency of operation of the primary and secondary power units 123, 128, 129, 130 in response to differing demands of the energy supply 134 and system output speed of each propulsion element 126. In particular, different operational combinations of the primary and secondary power units 123, 128, 129, 130 may be implemented to provide power in different ranges of output speeds of each propulsion element 126. The ranges of system output speeds may comprise a low range, which may be from zero output speed to a first threshold output speed, a middle range, which may be from the first threshold output speed to a second threshold output speed, and a high range, which may be from the second threshold output speed to a maximum output speed. The first threshold output speed may, for example, be approximately 20% of the maximum output speed and the second threshold output speed may, for example, be approximately 80% of the maximum output speed.

In the low range the propulsion element 126 of the first and/or second propulsion system 121,122 may be driven by at least one of the secondary power units 128, 129, 130 via the power transfer system 119. The transmissions systems 127 may be operated in the alternate power mode to supply power from the second energy conversion machines 125 to the propulsion elements 126, although the first energy conversion machines 124 may not receive any power from the primary power units 123. As the demanded output speed of the propulsion elements 126 increases from zero an increasing number of the secondary power units 128, 129, 130 may provide power to the power transfer system 119. Power from the first secondary power unit 128 may provide power for a propulsion element 126 of one of the first and second propulsion systems 121, 122 to be driven at up to a first low range intermediate speed (e.g. approximately 14% of maximum output speed). Power from the first and second secondary power units 128, 129 may provide power for the propulsion element 126 of the first propulsion system 121 to be driven at up to the first threshold output speed and the propulsion element 126 of the second propulsion system 122 to be driven at up to a second low range intermediate speed (e.g. approximately 10% of maximum output speed). Power from the first, second and third secondary power units 128, 129, 130 may provide power for both propulsion elements 126 of the first and second propulsion systems 121, 122 to be driven at up to the first threshold output speed.

In the middle range the power may be provided to the propulsion elements 126 by the primary power units 123 of the first and/or second propulsion systems 121, 122 when the transmission systems 127 are operated in the mechanical, combined or reverse power modes (whether indirect or direct). The first, second and third secondary power units 128, 129, 130 may not provide any power to the power transfer system 119. The first propulsion system 121 may be operated such that power from its primary power unit 123 provides up to the second threshold output speed of its propulsion element 126. The propulsion element 126 of the second propulsion system 122 may also be driven by the alternate power mode, by virtue of the power transfer system 119 receiving power from the primary power unit 123 of the first propulsion system 121, at an output speed of up to, for example, the first threshold output speed. The second propulsion system 122 may be operated in a similar manner to provide up to the second threshold output speed to its propulsion element 126. Both propulsion elements 126 of the first and second propulsion systems 121, 122 may be driven at the second threshold output speed by operating the primary power units 123 at their maximum output powers and operating the transmission systems 127 in the mechanical modes.

In the upper range the primary power units 123 of the first and second propulsion systems 121, 122 may be operated at their maximum power outputs and the transmission systems 127 in the reverse power modes. In a similar manner to the low range, at least one of the first, second and/or third secondary power units 128, 129, 130 may provide power to the power transfer system such that the propulsion elements of the first and/or second propulsion systems can be operated at up to their maximum output speeds. In particular, the second energy conversion machines 125 may operate as motors utilising energy from the first, second and/or third secondary power units 128, 129, 130 and rotate the sun gears 35 of the summation transmission 26 in a direction that increases the output speed of the ring gear 36 when receiving a steady input speed from the primary power unit 123.

INDUSTRIAL APPLICABILITY

The embodiment of FIGS. 2 and 3 may enable a direct mechanical connection between the at least one second energy conversion machine 51 and the first propulsion output shaft 40. As a result, redundancy of the propulsion system 11 may be improved as the propulsion element 12 may be driven by energy stored in the power transfer arrangement 52, such as in a battery, in the case of the power unit 17 failing to operate. Furthermore, in the case of the failure of the power unit coupling 30 or summation transmission 26 power may still be directed to the propulsion element 12. In addition, the location of the first power transfer shaft 46 at least partially within the first propulsion output shaft 40 increases the power density of the propulsions system 11 and thereby enables a more compact propulsion system 11, which may be beneficial in machines such as marine vessels 10 where reduced size is required.

The embodiment of FIG. 4 may enable the rotational direction of the propulsion element 12 to be reversed without needing to reverse the rotational direction of the power unit output shaft 21 or second energy conversion machine 51. As a result, the power unit 17 may be operated at its maximum efficiency, which is usually only achieve in a single output direction, even when the propulsion element 12 is driving the marine vessel 10 in a reverse direction. This arrangement may be particularly beneficial in marine vessels such as tugs that need to operate at high power in the reverse direction. Furthermore, in the embodiment of FIG. 4 it is possible to prevent the sun gear 35 from rotating utilising the power transfer coupler 49 in the mechanical mode, thereby increasing the efficiency of the output of the ring gear 36 as no energy is provided to rotate the sun gear 35.

The embodiment of FIG. 5 may enable the propulsion system 11 to be configured to provide different vertical or horizontal offsets between the propulsion element 12 and power unit 17. Such an arrangement may be particularly useful in marine vessels where the thrust from the propulsion element 12 is most efficient if it is directly horizontal (i.e. parallel to the plane of the surface of the water). In marine vessels, if an offset cannot be achieved, such as by needing the power unit 17 in a certain location, then usually the power unit output shaft 21 and propulsion element 12 are located at an acute angle to horizontal and thus some proportion of thrust power is lost as a vertical component of thrust. The flexibility of a horizontal or vertical offset may therefore enable the propulsion element 12 and power unit 17 to be located in an appropriate location and also provide a directly horizontal thrust. Furthermore, the embodiment of FIG. 5 may provide a relatively compact transmission system 20 which may be particularly suitable for thrusters or the like.

The embodiments of FIGS. 6 and 7 may provide increased power densities for a reversible power unit transmission 25 to that of FIGS. 4 and 5. In particular, by utilising the at least one planetary gearboxes 85, 86, 105 for providing the reversibility the power density may be three time higher than the embodiment of FIGS. 4 and 5. Thus the size of the propulsion system 11 may be reduced.

The embodiment of FIG. 9 may enable power to be transferred between the primary and secondary power units 123, 128, 129, 130, thereby providing greatly increased redundancy. The primary and secondary power units 123, 128, 129, 130 can be configured to operate most efficiently at the lower powers required in the low range. The primary power units 123 can be configured to operate most efficiently at up to their maximum power outputs for operation in the middle range. The upper range can be achieved by operating the transmission systems 127 to combine the output powers from the primary and secondary power units 123, 128, 129, 130 when they are all operating at their maximum output powers.

The invention claimed is:

1. A transmission system for a propulsion system, the propulsion system comprising at least one power unit, a power transfer system and at least one propulsion element, the transmission system comprising:
   a summation transmission configured to receive power from the at least one power unit and/or power transfer system;
   a propulsion output transmission comprising a first propulsion output shaft and configured to receive power from the summation transmission and direct the power to the at least one propulsion element; and
   a power transfer transmission operably connected to the summation transmission and configured to transfer power between the summation transmission and the power transfer system;
   wherein the power transfer transmission comprises a first power transfer shaft and a power transfer coupler configured to selectively operably connect the first power transfer shaft to the first propulsion output shaft such that power is transferred directly from the power transfer system to the propulsion output transmission, and
   wherein the propulsion output transmission further comprises a first propulsion output gear mounted to the first propulsion output shaft between the power transfer coupler and the summation transmission.

2. The transmission system as claimed in claim 1 wherein the first power transfer shaft is at least partially located within the first propulsion output shaft.

3. The transmission system as claimed in claim 1, wherein the propulsion output transmission comprises a second propulsion output gear mounted to a second propulsion output shaft and configured to receive power from the first propulsion output gear, the second propulsion output shaft being configured to provide power to the at least one propulsion element.

4. The transmission system as claimed in claim 1 wherein the summation transmission comprises a sun gear and a ring gear, the first power transfer shaft being operably connected to the sun gear and the first propulsion output shaft being operably connected to the ring gear.

5. The transmission system as claimed in claim 1 wherein the power transfer coupler comprises at least one of a clutch, a plate clutch, a dog clutch or a torque converter.

6. The transmission system as claimed in claim 1 wherein the power transfer system comprises at least one first energy conversion machine, at least one second energy conversion machine and at least one power transfer arrangement configured to transfer power between the first and second energy conversion machines.

7. The transmission system as claimed in claim 1 further comprising a power unit transmission configured to receive power from at least one power unit and selectively direct the power to the summation transmission and/or power transfer system.

8. The transmission system as claimed in claim 7 wherein the power unit transmission comprises a power unit coupler for selectively operably connecting the at least one power unit to the summation transmission.

9. A method of operating a transmission system for a propulsion system, the propulsion system comprising at least one power unit, a power transfer system and at least one propulsion element, the transmission system comprising:
a summation transmission configured to receive power from the at least one power unit and/or power transfer system;
a propulsion output transmission comprising a first propulsion output shaft and configured to receive power from the summation transmission and direct the power to the at least one propulsion element;
a power transfer transmission operably connected to the summation transmission and configured to transfer power between the summation transmission and the power transfer system, the power transfer transmission comprising a first power transfer shaft and a power transfer coupler; and
a power unit transmission, the power unit transmission comprising a power unit coupling;
wherein the method comprises:
receiving power at the power transfer transmission from the power transfer system;
receiving power at the power unit transmission from the at least one power unit;
determining whether to engage the power transfer coupler;
determining whether to engage the power unit coupling;
engaging the power unit coupling such that the power unit transmission is operably connected to the summation transmission and the power is transferred from the power unit to the summation transmission; and
engaging the power transfer coupler such that the first power transfer shaft is operably connected to the first propulsion output shaft such that power is transferred directly from the power transfer system to the propulsion output transmission.

10. A transmission system for a propulsion system for a marine vessel, the propulsion system comprising at least one power unit having a power unit output shaft, a power transfer system and at least one propulsion element, the transmission system comprising:
a summation transmission configured to receive power from the at least one power unit and/or power transfer system and provide a power output to the at least one propulsion element;
a power unit transmission for mounting to the at least one power unit output shaft to receive a rotational input therefrom, the power unit transmission being configured to selectively direct power from the rotational input to the summation transmission and/or power transfer system and comprising at least one planetary gearbox and at least one coupler for selectively directing the rotational input to the summation transmission in a first rotational direction or a second rotational direction, the at least one coupler configured to selectively lock the planetary gearbox to selectively direct the rotational input to the summation transmission in a first rotational direction or a second rotational direction.

11. The transmission system as claimed in claim 10 wherein the summation transmission comprises a carrier and the power unit transmission is operable to selectively drive the carrier in the first or second rotational directions.

12. The transmission system as claimed in claim 10 wherein the power unit transmission comprises:
a primary power unit transmission for selectively operably connecting the at least one power unit output shaft to the summation transmission via a primary power unit transmission coupling; and
a secondary power unit transmission for selectively operably connecting the at least one power unit output shaft to the summation transmission via a secondary power unit transmission coupling.

13. The transmission system as claimed in claim 12 wherein the secondary power unit transmission receives power from the primary power unit transmission via meshed gears.

14. The transmission system as claimed in claim 10, wherein the at least one planetary gearbox comprises a negative train planetary gearbox.

15. The transmission system as claimed in claim 10, wherein the power unit transmission comprises a first coupler for selectively preventing rotation of a ring gear of the negative planetary gearbox and a second coupler for selectively locking a carrier of the negative planetary gearbox to the ring gear of the negative planetary gearbox.

16. The transmission system as claimed in claim 10, wherein the power unit transmission comprises a first planetary gearbox comprising a first input ring gear, a second planetary gearbox comprising a second input ring gear, a first ring coupler for selectively preventing rotation of the first ring gear and a second ring coupler for selectively preventing rotation of the second ring gear.

17. A method of operating a transmission system for a propulsion system for a marine vessel, the propulsion system comprising at least one power unit having a power unit output shaft, a power transfer system and at least one propulsion element, the transmission system comprising:
a summation transmission configured to receive power from the at least one power unit and/or power transfer system and provide a power output to the at least one propulsion element;
a power unit transmission mounted to the at least one power unit output shaft to receive a rotational input therefrom and comprising at least one coupler configured to selectively direct power from the rotational input to the summation transmission and/or power transfer system,
the method comprising:
receiving the rotational input at the power unit transmission from the at least one power unit output shaft;

operating the at least one coupler to direct the rotational input to the summation transmission in a first rotational direction or a second rotational direction.

18. The method as claimed in claim 17 wherein the power unit transmission comprises:
a primary power unit transmission for selectively operably connecting the at least one power unit output shaft to the summation transmission via a primary power unit transmission coupling; and
a secondary power unit transmission for selectively operably connecting the at least one power unit output shaft to the summation transmission via a secondary power unit transmission coupling,
the method comprising:
engaging the primary power unit transmission coupling and disengaging the secondary power unit transmission coupling to drive the summation transmission in the first rotational direction; or
disengaging the primary power unit transmission coupling and engaging the secondary power unit transmission coupling to drive the summation transmission in the second rotational direction.

19. The method as claimed in claim 17 wherein the power unit transmission comprises at least one planetary gearbox, the method further comprising:
engaging the at least one coupler to lock the planetary gearbox to direct the rotational input to the summation transmission in the first rotational direction; or
disengaging the at least one coupler to lock the planetary gearbox to direct the rotational input to the summation transmission in the second rotational direction.

20. The method as claimed in claim 19 wherein the power unit transmission comprises a first coupler for selectively preventing rotation of a ring gear of the planetary gearbox and a second coupler for selectively locking a carrier of the planetary gearbox to the ring gear of the planetary gearbox and the method comprises:
disengaging the first coupler and engaging the second coupler to direct the rotational input to the summation transmission in the first rotational direction; or
engaging the first coupler and disengaging the second coupler to direct the rotational input to the summation transmission in the second rotational direction.

21. The method as claimed in claim 19 wherein the power unit transmission comprises a first planetary gearbox comprising a first input ring gear, a second planetary gearbox comprising a second input ring gear, a first ring coupler for selectively preventing rotation of the first ring gear and a second ring coupler for selectively preventing rotation of the second ring gear, the method comprising:
engaging the first coupler and disengaging the second coupler to direct the rotational input to the summation transmission in the first rotational direction; or
disengaging the first coupler and engaging the second coupler to direct the rotational input to the summation transmission in the second rotational direction.

22. A method of operating a propulsion apparatus, the propulsion apparatus comprising:
at least two propulsion systems, each comprising:
a transmission system configured to provide a power output to at least one propulsion element;
at least one first energy conversion machine;
at least one primary power unit operable to selectively drive the transmission system and/or the at least one first energy conversion machine; and
at least one second energy conversion machine operable to selectively drive or be driven by the transmission system,
at least one secondary power unit configured to selectively provide power to at least one power generator; and
a power transfer system for transferring power between the first and second energy conversion machines and at least one power generator;
wherein the method comprises:
receiving a demand to drive the at least one propulsion element at a system output speed;
operating at least one primary and/or secondary power unit to provide power to the at least one propulsion element via the power transfer system and/or transmission system.

23. The method as claimed in claim 22 further comprising:
determining whether to provide power to the at least one propulsion element from the at least one primary power unit directly via the transmission system and/or via the power transfer system; and
operating the transmission system to direct power from the at least one primary power unit to the at least one propulsion element directly or via the power transfer system.

24. The method as claimed in claim 22 further comprising:
in a low range of system output speeds directing power from at least one secondary power unit to at least one propulsion element;
in a medium range of system output speeds directing power from at least one primary power unit to at least one propulsion element; and/or
in a high range of system output speeds directing power from at least one primary power unit and at least one secondary power unit to the at least one propulsion element.

* * * * *